July 26, 1966  M. HASSAN  3,262,706
BALL JOINT SEAL
Filed July 30, 1962  2 Sheets-Sheet 2
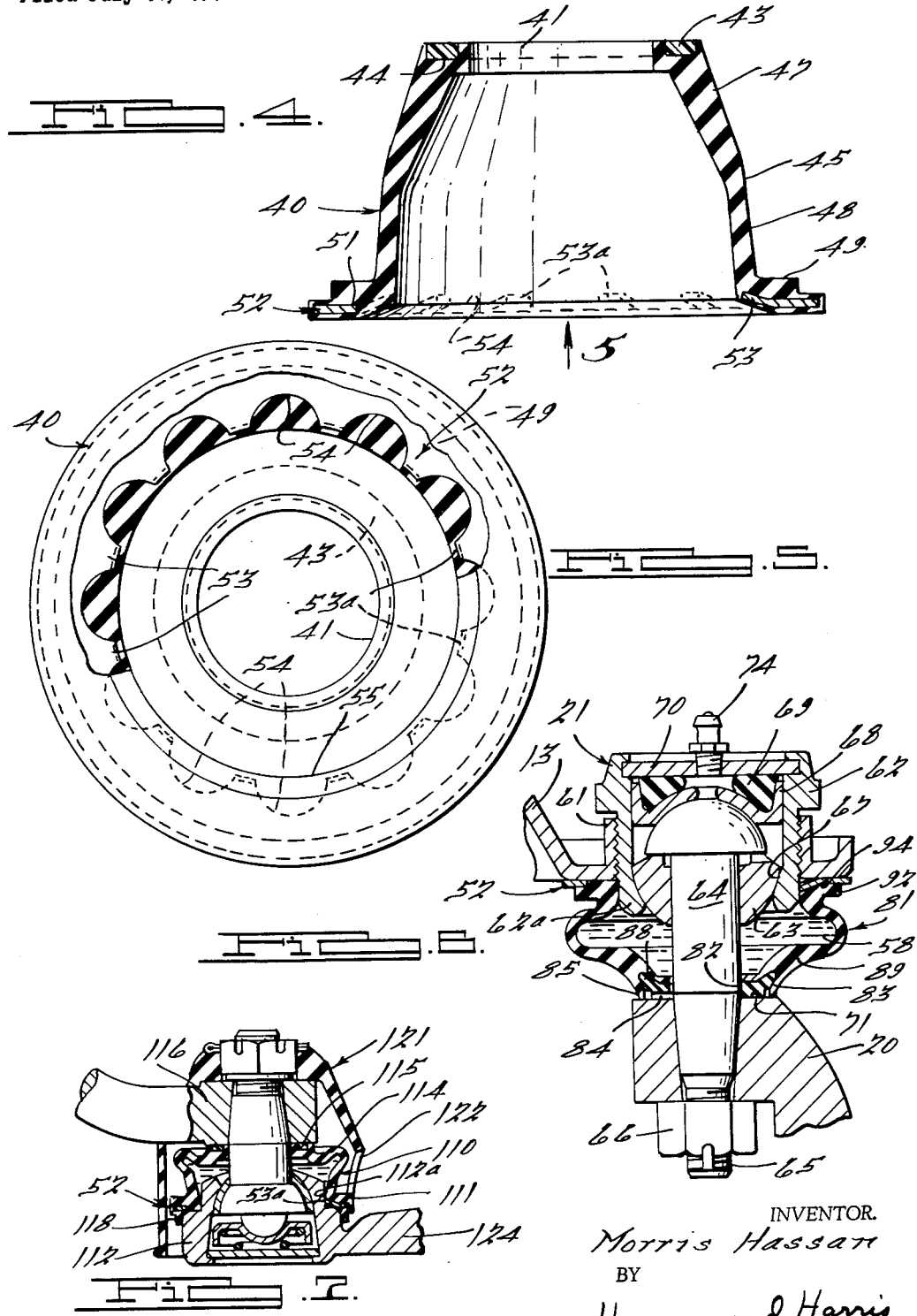
INVENTOR.
Morris Hassan
BY
Harness and Harris
ATTORNEYS.

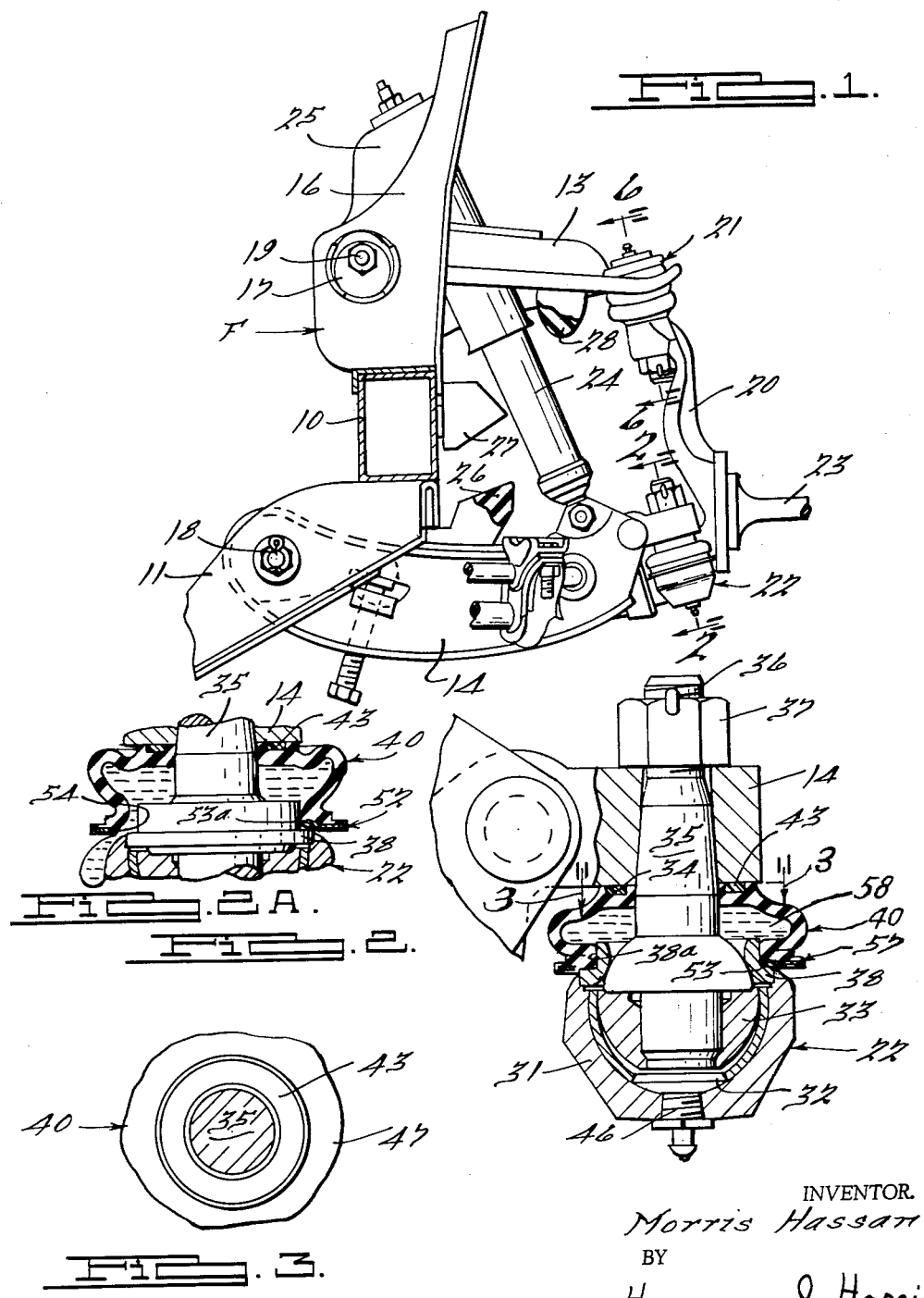

United States Patent Office 3,262,706
Patented July 26, 1966

1

3,262,706
BALL JOINT SEAL
Morris Hassan, Detroit, Mich., assignor to Chrysler Corporation, Highland Park, Mich., a corporation of Delaware
Filed July 30, 1962, Ser. No. 213,451
7 Claims. (Cl. 277—29)

This invention relates to ball joint seals and particularly to seals of the type used on motor vehicle suspension and tie rod ball joint assemblies.

It is a primary object of this invention to provide ball joint, balloon-type, flexible seals, that give maximum sealing against the ingress to the joint interior of dirt, water or other foreign matter while providing for complete freedom of movement between the joint connected elements and retention of the seal enclosed lubricant.

It is another object of this invention to provide an improved type of ball joint seal that will lend itself to so-called permanent or semi-permanent joint lubrication.

It is another object of this invention to provide a flexible, balloon-type, lubricant retaining, ball joint seal that lends itself to reliable sealing with maximum joint flexibility while resisting any tendency of the seal to collapse or to leak the lubricant supplied to the interior of the seal.

It is still another object of this invention to provide a stud mounted, balloon-type, lubricant retaining seal that has improved sealing portions to engage the associated stud and ball joint housing or casing so that maximum sealing with minimum wear may be achieved in a seal design that is economical to manufacture and easy to install.

It is still another object of this invention to incorporate a scalloped locking washer in a sealing boot to provide a self closing bleed bore for lubricant and a positive, lifetime sealing connection between the seal and its support.

Other objects and advantages of this invention will become readily apparent from a reading of the following description and a consideration of the related drawings wherein:

FIG. 1 is a sectional elevational view of a vehicle independent wheel suspension having ball joint assemblies embodying one form of this invention;

FIG. 2 is an enlarged sectional elevational view of the suspension lower ball joint assembly shown in FIG. 1, the view being taken along the line and in the direction of the arrows 2—2 of FIG. 1;

FIG. 2A is a fragmentary sectional elevational view similar to FIG. 2, but showing the expansion of the resilient seal during a pressure fill of the seal with lubricant;

FIG. 3 is a fragmentary sectional elevational view taken along the line and in the direction of the arrows 3—3 of FIG. 2;

FIG. 4 is a sectional elevational view of the seal shown in FIG. 2, showing the seal in its normal unstressed condition;

FIG. 5 is a bottom plan view of the seal shown in FIG. 4 looking in the direction of the arrow 5 of FIG. 4 with portions broken away for clarity of disclosure;

FIG. 6 is an enlarged sectional elevational view of the suspension upper ball joint assembly shown in FIG. 1, the view being taken on the line and in the directions of the arrows 6—6 of FIG. 1; and

2

FIG. 7 is a fragmentary sectional elevational view of the application of this invention to a tie rod ball joint connection.

FIG. 1 of the drawings shows a portion of a motor vehicle wheel supporting frame F that includes a longitudinally extending side rail 10 and a transversely extending, cross rail 11. Extending outwardly from and transversely of the side rail 10 and pivotally connected to a frame F for swinging movement about longitudinally extending pivot axes are upper and lower wheel supporting control arms 13 and 14 respectively. Upper control arm 13, which is substantially V-shaped in plan, is mounted on the frame side rail 10 by means of upstanding brackets 16 that support pivot pins 19 which include caster and camber adjustment means 17. Adjustment means 17 form no part of this invention. The disclosed adjustment means 17 is described in detail in the Robert H. Kushler et al. U.S. Patent 2,954,998 dated October 4, 1960. The lower control arm 14 is pivotally mounted on a cantilever-type pivot shaft 18 that is supported by the frame cross rail 11. This pivot shaft 18 and its associated torsion bar (not shown) are disclosed in the patent of John E. Collier et al. No. 2,972,489 dated February 21, 1961, and this particular pivot structure forms no part of this invention.

Control arms 13 and 14 have a wheel supporting knuckle 20 pivotally connected thereto by means of upper and lower ball joint connections 21 and 22, respectively. Knuckle 20 mounts a spindle 23 that is adapted to rotatably support a wheel (not shown). A shock absorber unit 24 is connected between the lower control arm 14 and a housing 25 seated on the frame side rail 10. Pivotal movement of the control arms 13, 14 is limited by engagement of the resilient bumpers 28, 26 with the frame mounted bumper bracket 27.

FIG. 2 is an enlarged fragmentary view of the lower control arm ball joint assembly 22. This ball joint assembly includes a housing 31 having a substantially hemispherical cavity 32 therein that is adapted to rotatably journal the ball-like head 33 of the stud 35. Stud 35 has the threaded end 36 of its shank portion fixedly connected to the lower control arm 14 by means of a nut 37. The upper end of the ball joint housing 33 has an integral flange-like collar 38 that provides a suitable outer surface against which to seat the lower end of the flexible, balloon-type, seal 40. It is the balloon seal 40 (see FIGS. 2–5) that embodies this invention.

Balloon seal 40 is of rubber-like material and it has been found that a high quality molded neoprene rubber is particularly suitable for balloon seals of the type herein disclosed. Seal 40 is of substantially inverted cup shape with an opening 41 in the top wall to sealingly receive the shank portion of the stud 35. Countersunk in the top of the seal 40 is a wear resistant plastic washer 43 of nylon or some similar self-lubricating, wear resistant, bearing material. The washer 43 is bonded to or otherwise fixedly connected to the seal top surface portion 44. From FIG. 2 it will be seen that the exposed upper surface of the washer 43 sealingly seats against the lower surface 34 of the control arm 14.

From FIG. 4 it will also be noted that the seal side walls are shaped so as to resist rupturing and to maintain the optimum shape during service. The top portions 47 of the seal side walls are relatively thick adjacent the seal top 44 and diverge downwardly while at the same time reducing in wall thickness until the point 45 is reached where the seal side wall becomes substantially vertical. The substantially vertical wall portion 48 is a cylinder of substantially uniform wall thickness and it extends from the termination of the diverging upper wall portions 47 to substantially to bottom of the seal. At the lower end of the vertical wall portion 48 the seal walls thicken out to form a radially outwardly extending collar or flange 49. The underside 51 of the collar 49 is adapted to seat on and be bonded to the top of the locking washer 52. The locking washer 52 represents the major improvement in this seal over and above what is shown in the copending application of L. M. Wallace et al., Serial No. 114,075, filed June 1, 1961, now United States Patent 3,175,834. This locking washer 52 provides a one-way locking device for easy mounting and positive locking of the lower end of the seal 40 on the associated housing flange 38. Washer 52 has the inner peripheral surface scalloped to provide spaced teeth 53 interconnected by substantially semi-circular root openings that serve as lubricant bleed bores during a pressurized filling of the seal interior as shown in FIG. 2A. Obviously, other shapes than semi-circular can be used for the bleed bore spaces 54 and likewise the teeth 53 can be shaped to be more rectangular or more triangular than those shown by way of example in the drawings. The important thing is that the inwardly disposed ends 53a of the teeth 53 are adapted to frictionally engage and anchor to the associated housing portion 38. Because of the upwardly inclined arrangement of the teeth 53 (see FIG. 4) it is thought to be obvious that when the seal is pushed downwardly on the vertically extending wall 38a of the housing portion 38 there will be little force required to mount the seal on the housing. However, if removal of the seal is attempted then considerably more force is required for an upward pull on the seal tends to flatten out the biting teeth 53 against the housing wall 38a. In certain forms of this invention it has been found that while only 170–180 pounds of force was required for installation of the seal that force in the range of 1700 to 1800 pounds was required for removal of the seal. This positive anchoring of the seal bottom portion 49 to the housing 38 insures that a lifetime seal will be maintained that will exclude the entry of dirt or other foreign matter to the seal interior through the bottom end thereof.

It will be noted that the rubber-like material that forms the seal body also covers the inner end edges 53a of the washer teeth so that a good compression seal will be achieved between the teeth and housing portion 38a. Also because the teeth ends 53a are covered with a film of rubber-like material, there is little chance of any rusting occurring at the locations when the teeth ends bitingly engage the housing 38.

As regards the lubricant bleed bores that result from the washer scallop openings 54, it is thought to be clear that normally there is a complete circular edge of rubber-like material 55 sealingly engaging the housing portion 38. However, when the seal interior is to be filled with lubricant 58 by connection of a pressurized lube gun to the lube fitting 46, then the bleed bores formed by the washer scallop openings 54 function to insure complete filling of the seal interior with lubricant without danger of rupture of the seal material. As can be seen from FIG. 2A, after filling of the seal interior with lubricant 58, then the rubber-like material surrounding the washer scallop openings 54 is expanded radially outwardly to permit excess lubricant to bleed out of the seal interior and prevent rupture of the seal. The sealing edge 55 of the seal boot normally contracts against the housing 38 to provide a tight sealed connection that will prevent the entry of dirt, water or other foreign matter to the seal interior while retaining the lubricant within the seal boot 40 for the life of the ball joint. This seal boot 40 thus provides a rupture proof seal with no fixed bleed port, but means to automatically provide a bleed port whenever a critical internal pressure develops within the seal.

The upper end of the seal boot 40 has a surface-to-surface seal between the plastic washer 43 and the undersurface 34 of the control arm 14. This surface-to-surface seal gives a lifetime seal and does not include a permanent bleed bore that could permit loss of lubricant or the entry of water, dirt or other foreign matter to the seal interior.

FIG. 6 shows a sectional elevational view of the upper ball joint assembly 21 shown in FIG. 1. The upper control arm 13 may be a sheet metal stamping having an upstanding collar 61 into which a ball joint housing 62 is screw connected. Housing 62 journals the ball-type head 63 of the stud 64 that has the threaded lower end 65 of the stud shank portion connected to the steering knuckle 20 by the nut 66. The stud ball 63 is urged into bearing relationship with the interior walls 67 of the housing 62 by the resiliently mounted bearing cap 68. Cap 68 is acted on by the compressed rubber washer 69 that is sandwiched between the bearing cap 68 and the cover plate 70. Cover plate 70 mounts a lubricant supply plug or fitting 74 to permit inspection and lubrication of the ball joint assembly.

Connected between the ball joint housing portion 62a and the top surface 71 of the steering knuckle 20 is another balloon type, flexible boot or seal 81 embodying this invention. Seal 81 is substantially a cup-shaped, flexible walled, boot element having an opening in the bottom that is adapted to sealingly receive the shank of the stud 64. Embedded in the outer side of the bottom wall of the seal 81 is a wear resistant, plastic, self-lubricating washer 83. Washer 83 provides a sealed bearing connection between the bottom wall of the seal and the knuckle upper surface 71. The washer bearing 83 has its outer face crossed by sets of grooves 84 that provide lubricant escape bores or channels so that the seal 81 will not be ruptured in the event an excess of grease is supplied to the joint and seal interior. It will be noted that the outer wall of the flexible boot 81 extends around the outer periphery of the plastic washer 83 so that an upstanding outer sealing lip 85 is provided that is adapted to be compressed against surface 71 to keep dirt, water or other foreign matter from reaching the interiorly positioned plastic washer 83. The inner peripheral surface 82 of the bearing washer 83 fits closely about the shank of the stud 64 as clearly shown in FIG. 6. Bearing washer 83 has an upper outwardly projecting peripheral rim 88 that provides a reinforcement for the lower side wall portion 89 of the sealing boot 81. The rim 88 projects upwardly and radially outwardly at approximately the same angle as the seal lower wall portions 89. The upper edge of the wall portion of seal boot 81 is enlarged to provide a radially outwardly extending flange portion 92. This flange 92 mounts a locking washer 52 that is identical to that described with relation to FIGS. 2–5. The metal washer reinforced flange 92 of the seal 81 is normally pressed on the lower edge portion 62a of the housing 62 so that a positive sealed connection is obtained between the reinforced flange 92 and the underside surface 94 of the upper control arm 13. Because of the scalloped washer connection at the top edge of the boot seal 81, it is apparent from the previous description of washer 52 that self sealing lubricant bleed grooves are provided at the top edge 92 of the boot 81.

FIG. 7 shows a seal 110, quite similar to the FIGS. 2–5 form of this invention, applied to a steering tie rod ball joint connection. It will be noted that the seal 110 has a metal washer reinforced rim flange 111 at its lower end including the scalloped washer 52 that is adapted to be mounted on the housing 112 by means of a press-fit connection between the washer teeth 53 and the housing wall 112a. The upper wall portions 114 of the flexible sealing boot 110 are thickened similar to the portion 89 of the FIG. 6 form of this invention. A self-lubricating, wear resistant, sealing ring 115 is bonded to the upper end of the seal 110 so that it can sealingly engage the underside of the link arm 116. Self-sealing lubricant bleed grooves or bores for the seal 110 are provided by the scalloped openings around the washer 52 as previously described. The seal 110 may also include a depending lip 118 beneath the washer 52 to sealingly engage the housing 112. This tie rod ball joint is shown to be substantially covered by a snap-on, flexible, rubber-like protecting boot 121 that has a cut out portion 122 to fit around the tie rod 124. Boot 121 protects the lubricant retaining seal 110 from the danger of being cut by flying stones or the like that may be thrown up by the vehicle wheels during vehicle movement.

The several types of lubricant retaining seals shown provide what is currently termed "permanently lubricated ball joints" in the motor vehicle industry. These joints extend the period of inspection for service from the prior required 2,000-mile interval to an approximtely 32,000-mile interval. Because of the positive locking washer connection of the seal to the associated housing wall a better seal retention is provided that excludes dirt, water and foreign matter from the seal interior while retaining the maximum lubricant within the seal interior for long lasting lubrication. The self-sealing bleed bores resulting from the scalloped washer construction insure complete filling of the seal interior with lubricant under pressure without danger of seal rupture. The locking teeth 53 on the seal washer 52 provide a positive one-way lock that is easy to install, but difficult to remove or dislodge. The rubber coating on the teeth 53 and adjacent washer portions gives an excellent sealed connection without developing rust development areas.

I claim:

1. A ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a rigidifying ring of bearing material bonded thereto and surrounding said opening with an outer face of said bearing ring arranged to have bearing contact with said associated member, an upstanding flexible ring of said seal side wall rubber-like material arranged peripherally about said bearing ring and arranged to be compressed against said associated member to provide a sealing ring around said bearing ring, a radially extending peripheral flange portion of rubber-like material on the seal side wall portions adjacent the cup open end and a toothed washer carried by said radially extending flange portion having radially inwardly directed teeth on the washer inner periphery adapted to engage and to seal against the ball joint housing, said washer teeth having the spaces therebetween normally filled by the rubber-like material of said seal peripheral flange portion which can be deflected by seal internal pressure to provide a normally closed, rupture-eliminating, self-sealing lubricant bleed bore for the seal.

2. A ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a rigidifying ring of bearing material bonded thereto and surrounding said opening with an outer face of said bearing ring arranged to have bearing contact with said associated member, an upstanding flexible ring of said seal side wall rubber-like material arranged peripherally about said bearing ring and arranged to be compressed against said associated member to provide a sealing ring around said bearing ring, a radially extending peripheral flange portion of rubber-like material on the seal side wall portions adjacent the cup open end and a toothed washer carried by said flange portion having radially inwardly directed teeth adapted to engage and to seal against the ball joint housing, certain of said washer teeth having a space therebetween normally filled by said seal rubber-like material providing a normally closed, rupture-eliminating, self-sealing lubricant bleed bore for the seal.

3. A ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a ring of self-lubricating bearing material bonded thereto and surrounding said opening with an outer face of said bearing ring arranged to have bearing contact with said associated member, an outwardly extending peripheral flange portion on the seal side wall portions adjacent the cup open end and a toothed washer carried by and bonded to said flanged portion having radially inwardly directed, teeth arranged to bitingly engage and to seal against the ball joint housing, said washer having radially outwardly extending spaces between certain of the teeth thereof which spaces are normally covered by a flange of rubber-like material which can be expanded radially outwardly by seal internal pressure to provide a self-sealing lubricant bleed bore for the seal.

4. In a seal as set forth in claim 3 wherein the washer teeth inner ends are flat and the spaces between certain washer teeth are substantially semi-circular in flange configuration.

5. A ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a ring of bearing material bonded thereto and surrounding said opening with an outer face of said bearing ring arranged to have bearing contact with said associated member, an outwardly extending peripheral flange portion on the seal side wall portions adjacent the cup open end, a rigidifying washer bonded to the outer face of said flange portion having radially inwardly directed teeth along its inner periphery spaced by enlarged root openings, said washer teeth and root opening being covered by a flexible annular rim of rubber-like material with the material covering the root openings being deflectable to provide self-sealing lubricant bleed bores, said teeth being arranged to frictionally engage and to seal against the ball joint housing.

6. In a ball joint seal as set forth in claim 5 wherein the washer teeth extend radially inwardly and are angled to converge toward the bottom of the cup-shaped seal element.

7. A ball joint seal comprising a resilient, thin-walled, cup-shaped element of rubber-like material including a bottom end wall portion having an opening therein to sealingly engage a ball joint stud shank and side wall portions to sealingly interconnect a ball joint housing and an associated member connected to the housing by the ball joint stud, said seal bottom end wall portion having a ring of self-lubricating bearing material bonded thereto and surrounding said opening with an outer face of said bearing ring arranged to have bearing contact with said associated member, an upstanding flexible lip on said seal side wall portions arranged peripherally about said bearing ring and arranged to engage against said associated member to provide a sealing ring around said bearing ring, an outwardly extending peripheral flange portion on the seal side wall portions adjacent the cup open end and a rigidifying washer laminated in said flange portion having radially inwardly extending teeth along its inner periphery arranged to engage and to seal against the ball joint housing, said flange portion at the open end of the cup-like seal having a depending lip adapted to sealingly engage the ball joint housing by surface contact around a peripheral portion of the associated housing.

References Cited by the Examiner

UNITED STATES PATENTS

| | | | |
|---|---|---|---|
| 963,060 | 7/1910 | Noppel | 277—212 X |
| 1,815,771 | 7/1931 | Grant. | |
| 2,559,857 | 7/1951 | Edwards. | |
| 2,971,787 | 2/1961 | Lincoln. | |
| 3,004,786 | 10/1961 | Herbenar. | |
| 3,021,148 | 2/1962 | Dickinson | 277—235 X |
| 3,024,050 | 3/1962 | Moskovitz. | |
| 3,175,834 | 3/1965 | Wallace et al. | |

FOREIGN PATENTS 1,007,277  2/1952  France.

EDWARD C. ALLEN, *Primary Examiner.*

A. V. KUNDRAT, *Assistant Examiner.*